July 21, 1970  S. C. HAMILTON  3,521,572
KINGPIN RECEIVER
Filed April 15, 1968  4 Sheets-Sheet 3
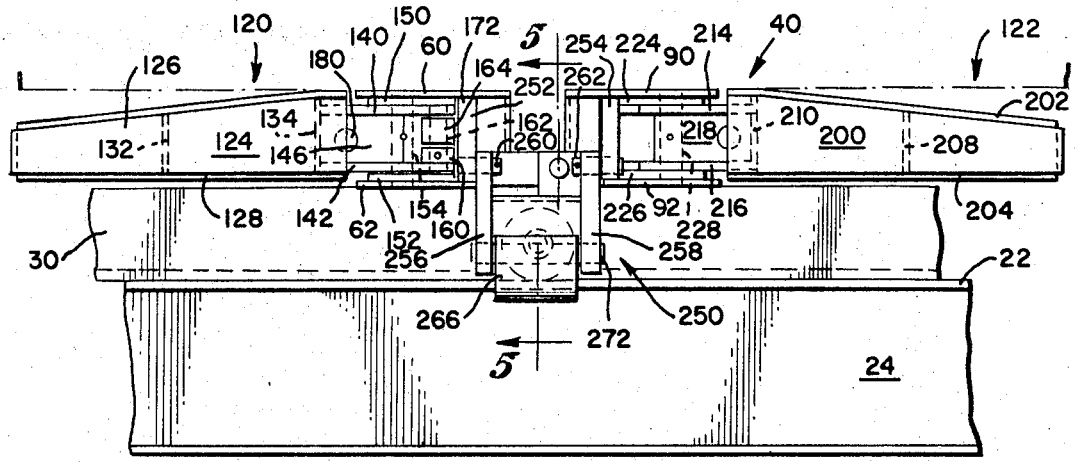
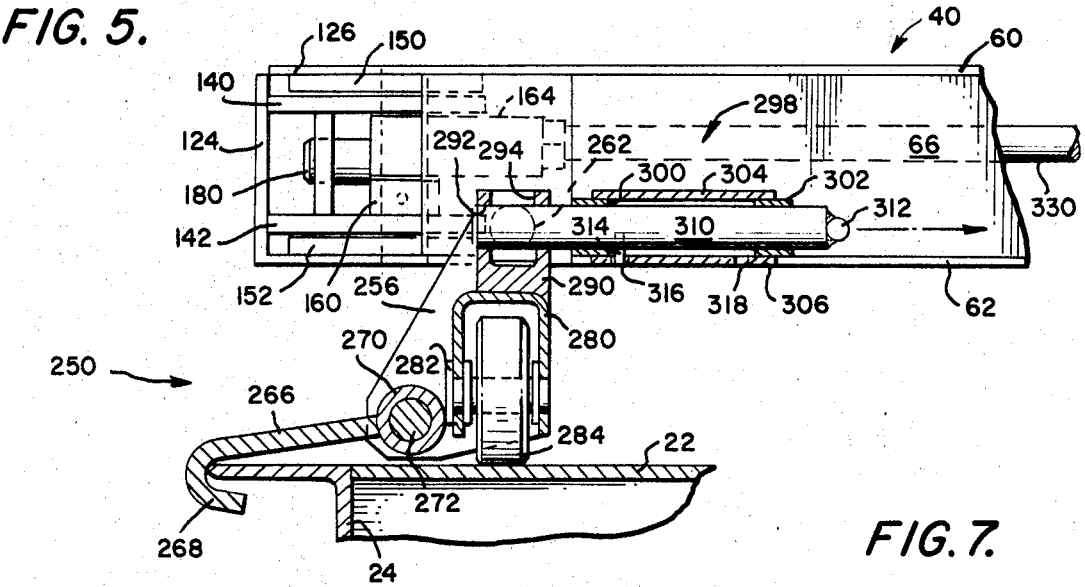
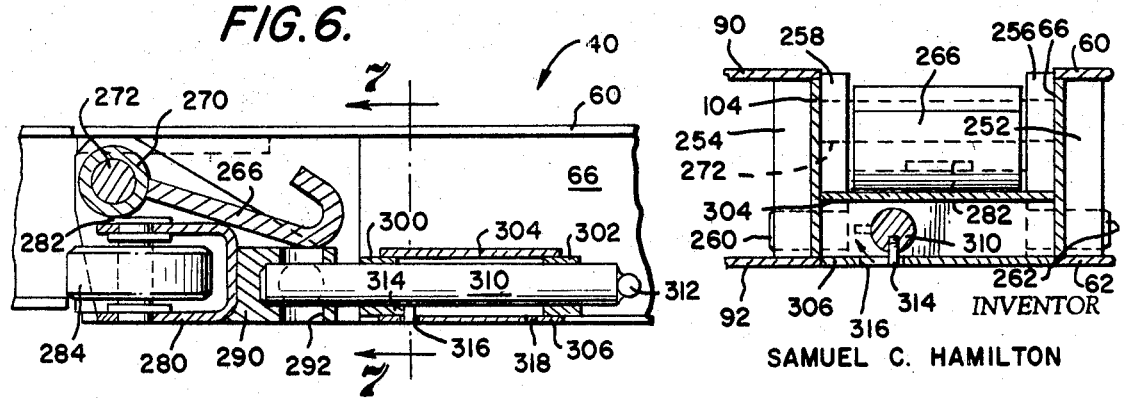
INVENTOR
SAMUEL C. HAMILTON
BY Bryan and Butrum
ATTORNEYS July 21, 1970   S. C. HAMILTON   3,521,572
KINGPIN RECEIVER
Filed April 15, 1968   4 Sheets-Sheet 4
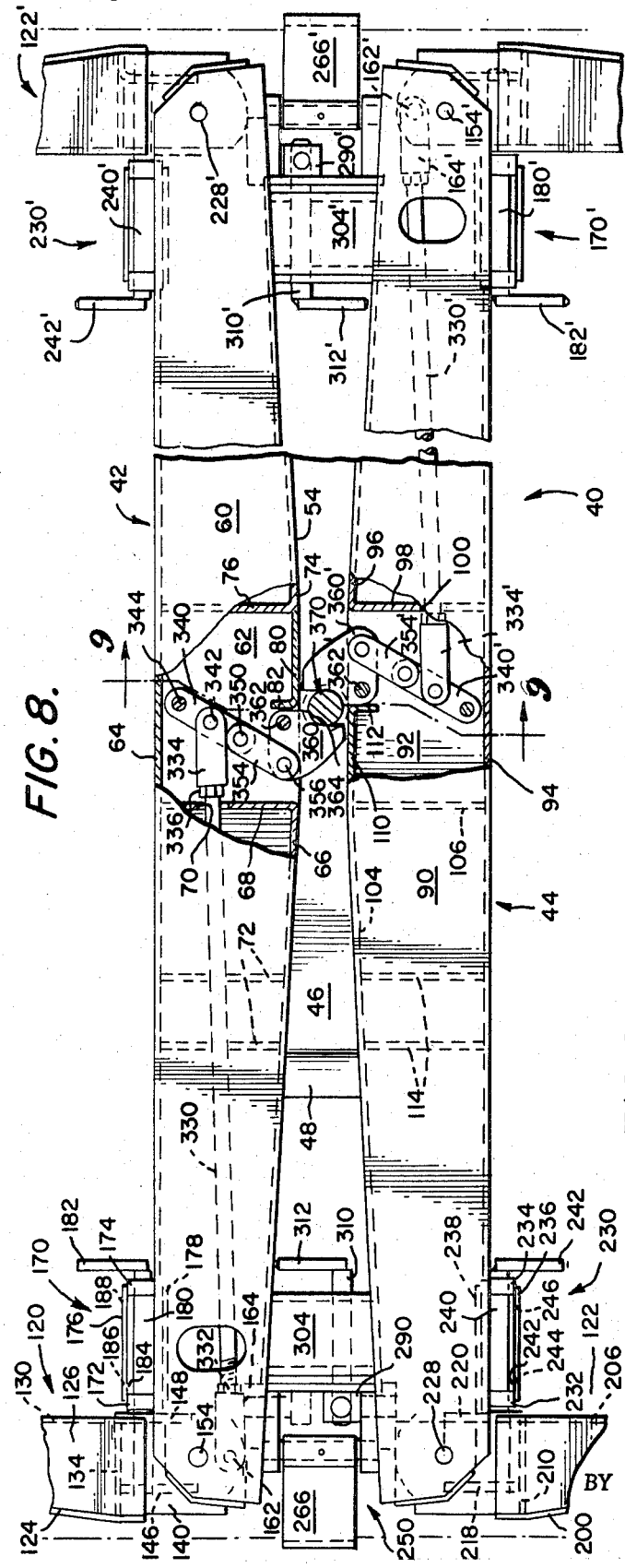
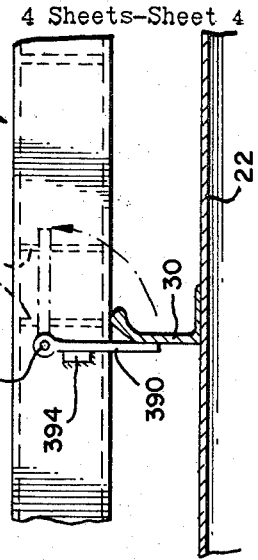
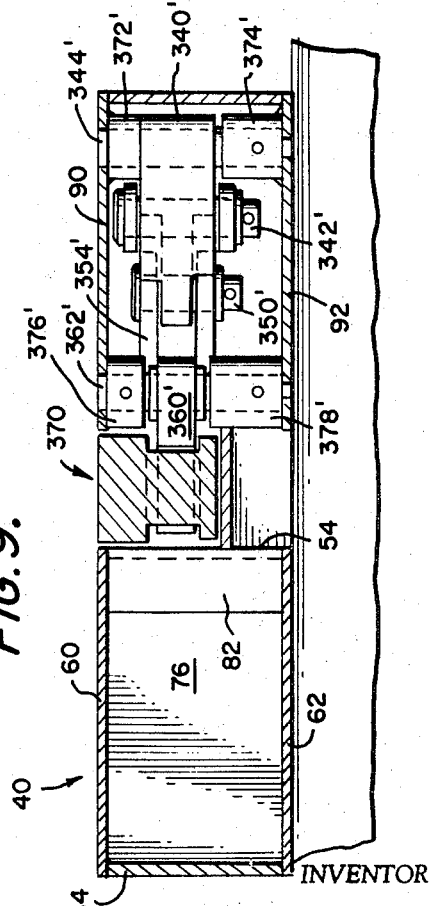
INVENTOR
SAMUEL C. HAMILTON
BY Bryan and Butrum
ATTORNEYS United States Patent Office 3,521,572
Patented July 21, 1970

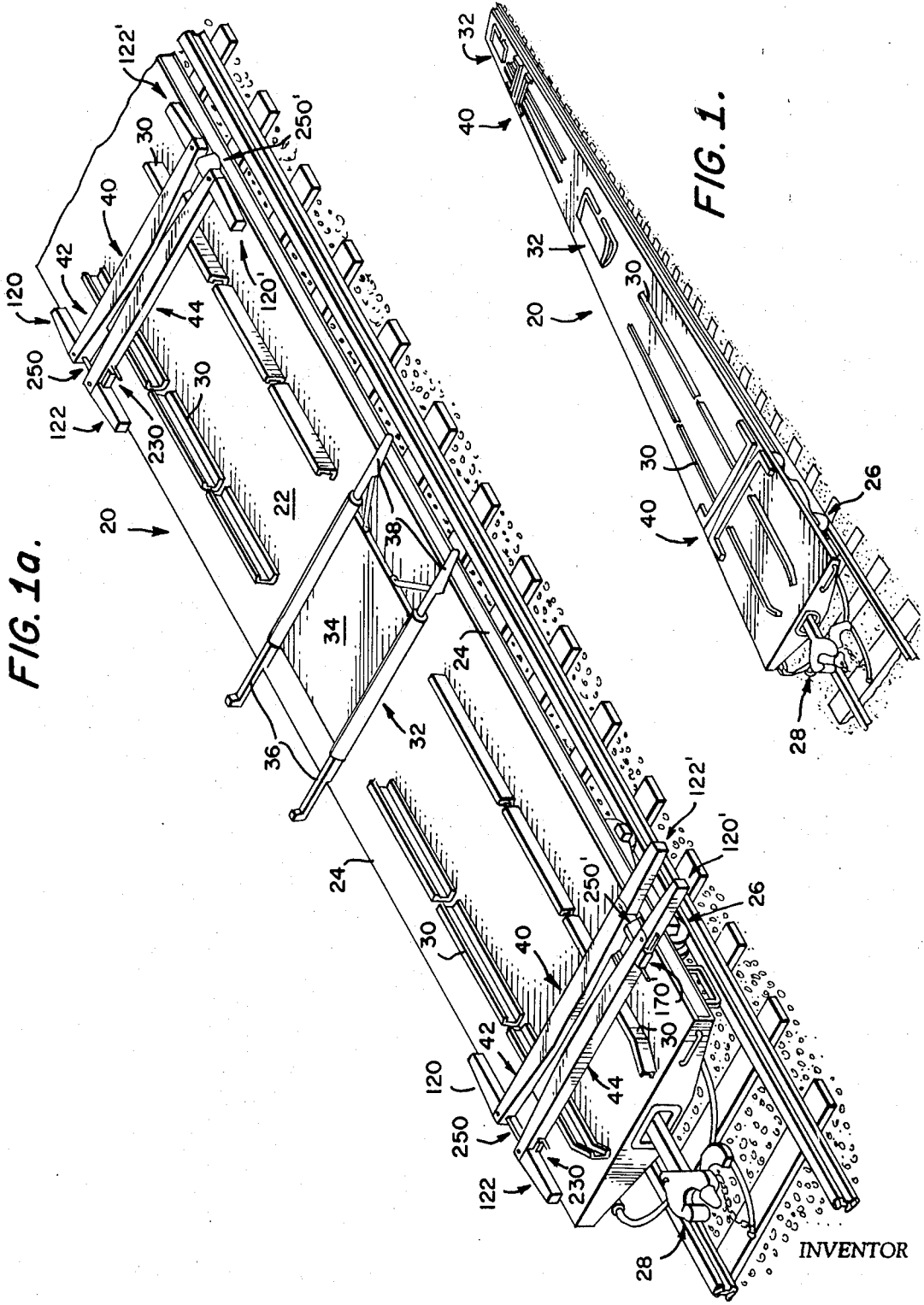

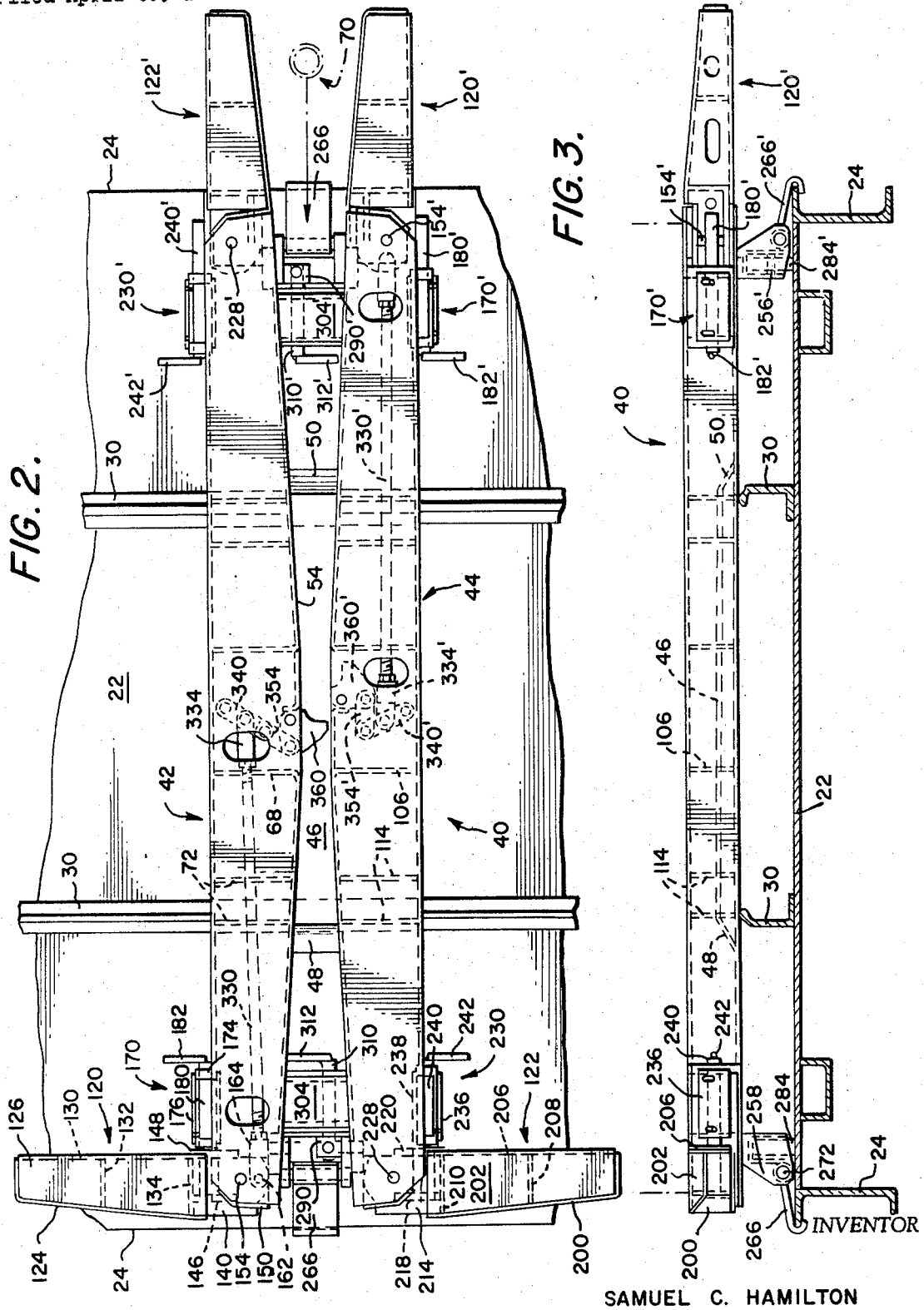

3,521,572
KINGPIN RECEIVER
Samuel C. Hamilton, Clifton, N.J., assignor to Magor Railcar Division, Fruehauf Corporation, Clifton, N.J., a corporation of Michigan
Filed Apr. 15, 1968, Ser. No. 721,391
Int. Cl. B65j 1/22; B60p 7/08
U.S. Cl. 105—366                                    2 Claims

ABSTRACT OF THE DISCLOSURE

A kingpin receiver is provided including a kingpin receiving slot extending throughout the width thereof. Extension arms are provided fore and aft of each end of the slot and are mounted for swinging movement from a folded stowed position to a projecting kingpin receiving and guiding position. A kingpin latching means is movably mounted at the center portion of the slot and is interconnected with said extension arms so as to be automatically operated between locked and unlocked position upon movement of said extension arms between stowed and kingpin receiving positions.

BACKGROUND OF THE INVENTION

The present invention relates generally to an apparatus for use on a railway car or other support means wherein a container or trailer body is adapted to be transferred from a highway tractor and wheel assembly to a railway car or the like.

While the present invention is illustrated as being particularly adapted for use with a railway car, it may also be readily employed with other carriers or stationary support means if so desired.

In modern shipping procedures, containers are being increasingly employed, and in many instances it is necessary to transfer the container from one type of vehicle to another. In a typical example, the container may be carried by a tractor and wheel assembly arrangement to a freight yard and there transferred to a railway car. The container is then subsequently transferred back onto a similar tractor and wheel assembly for transport to its final destination.

U.S. Pat. No. 3,112,040 discloses an arrangement wherein a railway car is provided with a rotatable turntable and an adjustable kingpin receiving support whereby the desired transfer operations may be carried out. This patent details the various steps involved in the loading and unloading operation, and also discloses a unique tractor employed with this type of structure.

Transfer of a container or trailer body between a tractor and wheel assembly in a railway car may be carried out quite efficiently with the apparatus illustrated in this patent, and a minimum number of personnel are required, while the operations may be carried out in a very short period of time. However, this type of arrangement presents certain disadvantages. The transfer system according to this concept requires a particular railway car construction as shown in the patent wherein the underframe is of a skeleton-like arrangement, and has a width which is substantially less than that of full deck cars. This type of construction is necessary since the kingpin receiver mechanism thereof is so designed that in order to transfer the kingpin from a tractor into a slot provided in the kingpin receiver, the edge of the kingpin receiver must be positioned outboard of the side of the railway car. The maximum width of the kingpin receiver is limited by certain standards required in this field to provide proper clearances in over-the-road travel, and accordingly it is necessary to reduce the width of the railway car so that the kingpin may properly enter the slot in the kingpin receiver.

The skeleton underframe as required in the railway car as shown in this U.S. patent offers only limited utility since the railway car cannot be employed in other types of shipping procedures. For example, this skeleton underframe cannot receive a conventional trailer for "piggy-back" type shipping, nor is it adapted to receive other types of cargo requiring a full deck car for support thereof.

U.S. Pat. No. 3,204,579 discloses a multi-purpose railway car which overcomes the objections of the structure illustrated in U.S. Pat. No. 3,112,040, the car shown in this second mentioned U.S. patent being adapted to accommodate "piggy-back" shipment and "lift-on"-"lift-off" service as well as the aforementioned container transfer procedures as illustrated in U.S. Pat. No. 3,112,040.

The structure of U.S. Pat. No. 3,204,579 includes a rotatable turntable and a combination hitch which may be elevated or oscillated in accordance with the type of shipping being carried out. This combination hitch construction hitch construction is a bulky, complex and expensive construction and requires the use of electric torque wrenches to operate.

SUMMARY OF THE INVENTION

The present invention is directed to a novel kingpin receiver which cooperates with a conventional turntable structure to support a container or trailer body. The kingpin receiver is adapted to receive and hold a kingpin so that the associated container or trailer body will be securely held in proper position.

The kingpin receiver of the present invention comprises a complete unit which may be easily mounted on conventional full deck cars to enable such cars to be converted to so-called Flexi-Van service. The unit can be folded so it can be stowed between the curb guides of a flatcar, and further it can be readily removed from the car and stored if the car is to be put into some other type of service. The kingpin receiver as disclosed herein can be employed either with a turntable or with some other type of side loading device and with regular containers or trailers having detachable bogies. This kingpin receiver arrangement enables the associated railway car to be extremely versatile and to be used in a number of different shipping modes.

The invention kingpin receiver incorporates extension means adapted to extend laterally beyond the sides of the associated railway car for receiving and guiding a kingpin into operative position relative thereto. These extension means enable the apparatus to be employed with a conventional full deck car, and accordingly a special skeleton underframe construction is not required.

The kingpin receiver unit includes means for facilitating movement thereof longitudinally with respect to the associated railway car to accommodate containers or trailer bodies of different lengths.

Additionally, the kingpin receiver includes kingpin latching means, and means is further provided for connecting the latching means with the extension means for automatically operating the latching means into kingpin retaining position when the extension means is folded into its stowed position, and for further moving a portion of the latching means to release position when an associated extension means is swung outwardly into its extended operative position.

BRIEF DESCRIPTION OF THE DRAWINGS

FIG. 1 is a top perspective view illustrating an overall view of a railway car having the kingpin receiver of the present invention mounted thereon;

FIG. 1a is an enlarged top perspective view of a portion of the structure shown in FIG. 1;

FIG. 2 is a top view of the kingpin receiver of the present invention shown in operative position on a railway car;

FIG. 3 is a front view of the kingpin receiver shown in FIG. 2 with the underlying portions of the railway car shown in section;

FIG. 4 is an end view of the left-hand end portion of the structure shown in FIG. 2 on an enlarged scale;

FIG. 5 is a sectional view on an enlarged scale taken substantially along line 5—5 of FIG. 4 looking in the direction of the arrows;

FIG. 6 is a view illustrating a portion of the structure shown in FIG. 5 in a different operative position;

FIG. 7 is a sectional view taken substantially along line 7—7 of FIG. 6 looking in the direction of the arrows;

FIG. 8 is a top view on an enlarged scale of the kingpin receiver of the present invention with portions broken away for the sake of clarity;

FIG. 9 is a sectional view taken substantially along line 9—9 of FIG. 8 looking in the direction of the arrows; and FIG. 10 is a sectional view taken through a portion of the structure of the present invention illustrating a modified form of lateral restraining means.

DESCRIPTION OF THE PREFERRED EMBODIMENTS

Referring now to the drawings wherein like reference characters designate corresponding parts throughout the several views, a flatbed railway car is indicated generally by reference numeral 20 in FIGS. 1 and 1a. The car includes a flat deck 22 including conventional side sills 24 formed at opposite sides thereof. The car is supported by conventional trucks 26, and the usual coupling mechanism 28 is provided at the ends theerof. Suitable curb guide means 30 are secured to the deck 22 and extend upwardly therefrom for guiding the wheels of trailers therealong when the car is utilized in "piggy-back" operations.

The car is illustrated as being adapted to receive a pair of containers or trailer bodies thereon, and a pair of rotatable turntables 32 are provided. These turntables may be substantially identical with those as shown in the aforementioned U.S. Pat. No. 3,204,579. The turntables each include a frame portion 34. A pair of positioning arms 36 are connected with one end of each frame, and a pair of ramp portions 38 are connected with the opposite end of each frame. These turntables operate in the manner as set forth in the aforementioned U.S. patent.

A pair of kingpin receivers 40 according to the present invention are illustrated as mounted upon the car is spaced relationship to the associated turntable whereby a turntable and a kingpin receiver are adapted to cooperate with one another to receive and support a trailer body or container on the car.

Referring now to FIGS. 2–9 inclusive, the details of construction of an individual kingpin receiver unit according to the present invention are illustrated. While a particular construction of the components is illustrated, it should be understood that in the production design, castings or forgings may be employed for reducing the number of parts of the unit and to facilitate assembly.

The body means of the kingpin receiver as seen most clearly in FIGS. 2 and 4 includes a pair of halves 42 and 44 which are of similar construction and which are rigidly interconnected with one another by a central bridging member 46 having opposite downwardly sloping end portions 48 and 50 as seen most clearly in FIGS. 2 and 3. This bridging member may be suitably interconnected with the two halves of the body means as by welding or the like.

It will be noted particularly as seen in FIGS. 2 and 8 that the body means defines an elongated slot 54 which extends throughout the width of the body means and is open at both sides of the body means. The slot tapers inwardly from both sides of the body means toward the central portion of the body means. This slot is adapted to receive a kingpin and guide the kingpin into the central portion of the slot to be held at the central part of the kingpin received as hereinafter described.

The body portion 42 includes an upper plate 60 and a substantially parallel lower plate 62. An outer side plate 64 is rigidly interconnected as by welding between one edge of the upper and lower plates. An inner side plate 66 is secured between the opposite edges of upper and lower plates 60 and 62 and includes a transversely extending end portion 68 having a hole 70 formed therethrough for a purpose hereinafter described. A pair of reinforcing plates 72 are connected between the upper and lower plates and the opposite side plates, all of these members being interconnected in a suitable manner as by welding.

A further inner plate 74 is connected between the side edges of the upper and lower plates and includes a transversely extending portion 76. A further plate 80 is connected between the upper and lower plates 60 and 62, plate 80 including an inwardly projecting portion 82.

The body portion 44 includes an upper plate 90 and a generally parallel lower plate 92. An outer side plate 94 is connected between one side edge of the upper and lower plates. An inner side plate 96 is secured between the opposite edges of the upper and lower plates and includes a transversely extending portion 98 having a hole 100 formed therethrough for a purpose hereinafter described.

A further inner plate 104 is connected between the inner edges of the upper and lower plates and includes a transversely extending portion 106. A plate 110 is also connected between the upper and lower plates and includes an inwardly projecting portion 112. A pair of reinforcing plates 114 are connected between the upper and lower plates and the inner plate 104 and outer plate 94, all of these components being suitably connected as by welding or the like.

Extension means is provided at opposite sides of the body means, and as seen in the drawings, a pair of extension arms indicated generally by reference numeral 120 and 122 are swingably disposed at the left-hand side of the body means at opposite sides of the slot opening through the associated side of the body means.

The arm 120 includes an L-shaped guide plate 124 which is rigidly interconnected with a top plate 126 and a bottom plate 128. A plate 130 is interconnected between the opposite edges of the top and bottom plates. Reinforcing plates 132 and 134 extend between the guide plate 124 and the plate 130.

A pair of generally parallel horizontally disposed plates 140 and 142 extend laterally from plate 134 and are rigidly interconnected therewith. A further pair of generally parallel plates 146 and 148 are disposed substantially vertically and are connected with the plates 140 and 142 for a purpose hereinafter described.

A plate 150 is secured to the undersurface of the top plate 60 previously described, and a plate 152 is secured to the upper surface of the bottom plate 62. The top and bottom plates 60 and 62, the plates 150 and 152, and the plates 140 and 142 are all provided with aligned holes formed therethrough which receive a pivot pin 154 suitably held in place for pivotally interconnecting the arm 120 with the body portion 42.

A boss 160 is secured to the upper surface of the plate 142, this boss as well as plates 140 and 142 having aligned holes formed therethrough receiving a pivot pin 162 which is suitably held in position for pivotally supporting a fitting 164 for a purpose hereinafter described.

Lock means is provided for locking the arm 120 in either its extended or stowed position. As seen most clearly in FIG. 8, the lock means 170 includes a pair of generally vertically extending blocks 172 and 174 which are supported between the top and bottom plates 60 and 62 of the body portion 42. An elongated pair of plates 176 and 178 are secured between the blocks 172 and 174. A generally cylindrical pin member 180 is slidably positioned within suitable holes provided in blocks 172 and 174, and a laterally extending handle portion 182 is connected with pin 180.

A generally cylindrical lug 184 extends radially outwardly of pin 180 and is adapted to fit within one of two elongated slots 186 and 188 provided in plate 176. When the lug is disposed within the slot 186, pin 180 is held in its lock position, and when the lug is disposed within the slot 188, pin 180 is held in its unlock position. As illustrated in FIG. 8, the arm 120 is disposed in a stowed position. The pin 180 extends through and is snugly received in suitable aligned holes provided in plates 146 and 148 previously described.

The arm 122 is of a construction similar to the arm 120 and includes a generally L-shaped guide member 200 interconnected with a top plate 202 and a bottom plate 204. A rear plate 206 is connected between the opposite edges of the top and bottom plates. A pair of reinforcing plates 208 and 210 are secured between the guide plate 200 and the rear plate 206.

A pair of spaced generally parallel horizontally disposed plates 214 and 216 extend laterally from plate 210. A further pair of generally vertically disposed parallel plates 218 and 220 are rigidly connected between plates 214 and 216.

A plate 224 is secured to the undersurface of the top plate 90 of the body portion 44, and a plate 226 is secured to the upper surface of the bottom plate 92. The top and bottom plates 90 and 92, the plates 224 and 226, and the plates 214 and 216 of the arm 122 are all provided with aligned holes receiving a pivot pin 228 extending through the holes and suitably held in place for supporting the arm 122 for pivotal movement with respect to the body portion 44.

A lock means for locking the arm 122 in operative position is seen most clearly in FIG. 8 and is indicated by reference numeral 230. This locking means includes a pair of blocks 232 and 234 spaced from one another and rigidly secured between the upper and lower plates 90 and 92 of the body portion 44. A pair of elongated plates 236 and 238 are rigidly connected between blocks 232 and 234.

A generally cylindrical lock pin 240 is slidably positioned within suitable aligned holes provided in blocks 232 and 234, a manually operable handle 242 extending laterally from the lock pin 240. Lock pin 240 is adapted to extend through and is snugly received in aligned holes provided in plates 218 and 220, and as illustrated in FIG. 8, the arm 122 is locked in its stowed position.

Detent means for holding lock pin 240 in operable position includes a generally cylindrical radially extending lug 242 secured to pin 240. This lug is adapted to fit within one of the two elongated slots 244 and 246 formed in the plate 236. As illustrated, the lug is disposed within the slot 244 for holding the pin in lock position. When the lug is disposed in the slot 246, it is held in the unlock position.

A lateral restraining means is indicated generally by reference numeral 250. A first plate 252 is rigidly secured between the upper and lower plates 60 and 62 of the body portion 42, and a similar plate 254 is rigidly secured between the top and bottom plates 90 and 92 of the body portion 44.

A further pair of spaced plates 256 and 258 are provided, these plates being pivotally supported by plates 252 and 254 by pivot pins 260 and 262 respectively extending through suitable aligned holes provided in these plates and being suitably held in place.

As seen most clearly in FIG. 5, a restraining member 266 includes an outer hook portion 268 adapted to hook around the side sill 24 of the associated railway car. The restraining member is rigidly interconnected with a cylindrical portion 270 which is rotatably mounted upon a pivot pin 272. This pivot pin 272 extends through aligned holes provided in plates 256 and 258, the pin being suitably held in place whereby the restraining member 266 is pivotally supported between the plates 256 and 258.

A channel member 280 of generally U-shaped cross-sectional configuration is rigidly secured between the plates 256 and 258. A pin member 282 extends through aligned holes provided in the depending parallel wall portions of member 280 and serves to rotatably support an antifriction wheel member 284. This wheel member is adapted to be supported on and move along the upper surface of the deck 22 to enable the kingpin receiver to be readily adjusted longitudinally of the associated railway car.

A lock block 290 is rigidly secured to the upper surface of member 280 and to the plate 258. The lock block is provided with a first bore 292 extending therethrough, and a second bore 294 in communication with the first bore 292 extends at right angles to the first bore 292 for a purpose hereinafter described.

A lock means for locking the support for the restraining means and the antifriction means is indicated generally by reference numeral 298, and includes a pair of spaced generally parallel blocks 300 and 302 having the opposite ends thereof rigidly secured to the members 66 and 104 of the body portions 42 and 44 respectively. A pair of plates 304 and 306 are rigidly connected between the blocks 300 and 302.

A lock pin 310 of generally cylindrical configuration has a laterally extending handle portion 312 at one end thereof and is slidably positioned within suitable holes provided in the blocks 300 and 302.

A generally cylindrical lug 314 extends radially outwardly from lock pin 310 and is adapted to fit within one of two elongated slots 316 and 318 formed in the plate 306. As illustrated, the lug 314 is disposed within the slot 316, and this is the lock position wherein pin 310 is disposed within the bore 292 formed through the lock block 290. It is apparent that in this position, the lock pin will hold the lateral restraining means and the antifriction means in the operative relationship illustrated. It is apparent that when the members are being pivoted into the position illustrated, the restraining member 266 can be hooked over the side sill and moved into the operative position illustrated, whereupon the lock pin is inserted within bore 292 in the lock block.

When it is desired to stow the kingpin receiver, the lock pin 310 may be withdrawn from the operative position illustrated by first pivoting the lock pin so as to remove lug 314 from slot 316, whereupon the lock pin may be moved out of bore 292. The assembly may then be swung upwardly into the operative relationship shown in FIG. 6 wherein the lock pin 310 is inserted within the bore 294 in the lock block to hold the components in the position shown in FIG. 6 wherein the lateral restraining means and antifriction means assembly lies within the same horizontal dimensions as the remainder of the kingpin receiver to permit stowage of the entire kingpin receiver assembly between the curb guides of the associated railway car without extending above such curb guides.

As seen most clearly in FIG. 8, the fitting 164, which is pivotally interconnected by pin 162 with the arm 120, is provided with a threaded socket adapted to receive the threaded end portion of a connecting rod 330. In this manner, the position of the connecting rod with respect to the fitting 164 may be adjusted, and a lock nut 332 is provided for holding these members in adjusted relationship.

The connecting rod 330 extends through suitable holes provided in the plates 72 and through the hole 70 provided in portion 68 previously described. The opposite end of connecting rod 330 is also threaded and is received within a threaded socket provided in the fitting 334. The position of the connecting rod may accordingly also be adjusted with respect to fitting 334, and a lock nut 336 is provided for holding these members in adjusted relationship with respect to one another. The end portion of fitting 334 is bifurcated and is connected by a pivot pin 342 with a link 340 which is pivotally supported at one end thereof by a pin 342 supported between suitable bosses secured to the top and bottom plates 60 and 62 of the body portion 42.

The opposite end of link 340 is of reduced dimension and is pivotally interconnected by means of a pivot pin 350 with a pair of spaced generally parallel links 354 disposed one over the other, the opposite ends of these links being connected by a pivot pin 356 with a latch member 360. This latch member 360 comprises a generally flat plate pivotally supported by a pivot pin 362 which in turn is supported by suitable bosses secured to the top and bottom plates 60 and 62 of body portion 42. The latch member 360 includes an arcuate cutout portion 364 which is adapted to snugly engage and hold a kingpin 370 in place.

The latching mechanism supported by the body portion 44 is identical with that supported by the body portion 42 and represents a mirror image thereof. Accordingly, similar components have been given the same reference numerals primed. As seen in FIG. 9, pivot pin 344' is supported between bosses 372' and 374', and pivot pin 362' is supported between the bosses 376' and 378'. It will of course be understood that similar bosses are provided for supporting pivot pins 344 and 362 in the latching mechanism associated with body portion 42.

The structure illustrated at the right-hand side of FIGS. 2, 3 and 8 is substantially identical with the corresponding structure shown at the left-hand side of these figures, and accordingly similar components have been given the same reference numerals primed for the sake of simplicity. It will of course be understood that the operation of the mechanisms at either side of the kingpin receiver is substantially identical.

It will be noted that, when the arms 120 and 120' are disposed in the stowed positions as shown in FIG. 8, the latch members 360 and 360' are automatically moved into the kingpin retaining position as shown in this figure to hold the kingpin in proper position within the kingpin receiver for transport. On the other hand, when the arm 120' is swung outwardly into its extended position as shown in FIG. 2, it will be noted that the mechanical interconnection through the intermediary of connecting rod 330' causes the latch member 360' to be automatically moved into the unlock position as illustrated.

Accordingly, when the swingable extension arms are moved into the kingpin receiving and guiding position shown in FIG. 2, the kingpin latching means associated therewith is moved into the unlock position. It is apparent that when the components are in the operative position as seen most clearly in FIGS. 1 and 2 wherein the extension arms at one side of the kingpin receiver are swung outwardly into their extended position, while the extension arms at the opposite side of the kingpin receiver remain in their stowed position, the apparatus is adapted to receive a kingpin from one side of the railway car.

A kingpin 70 is indicated in phantom line in FIG. 2, and as the kingpin moves inwardly, it will engage one of the guide plates 124 or 200 if the kingpin is not properly aligned, these surfaces converging inwardly toward the center of the kingpin receivers so as to guide the kingpin into the slot 54 defined by the body means of the unit.

The kingpin will thereupon be guided inwardly to the center portion of the kingpin receiver where the latch member 360 will positively limit movement of the kingpin. When the kingpin strikes latch member 360, the operator will know that the kingpin has been centered within the kingpin receiver.

The trailer body or container may then be disengaged from the associated tractor, and the tractor may move away from the apparatus. The arms 120' and 122' are then swung into the stowed position illustrated in FIG. 8. As arm 120' is swung inwardly into the stowed position, the latch member 360' will be pivoted into the lock position shown in FIG. 8, and the kingpin will be retained in proper position.

It is apparent that with this arrangement, the kingpin receiver is equally suited for receiving the kingpin of an associated trailer body or container from either side of the apparatus.

Referring now to FIG. 10, a modified form of lateral restraining means is illustrated. As seen in this figure, a restraining member 390 is pivotally supported upon a pin 392 suitably mounted within the body portion 42. A stop member 394 is fixed with respect to body portion 42 and limits clockwise movement of the restraining member 390 as seen in this figure. As shown, the restraining member is in engagement with the curb guide 30 so as to limit movement of the body means to the right. It will be understood that a similar restraining member is mounted in spaced relationship to the restraining member shown for engagement with a parallel curb guide whereby a lateral movement of the body means in either direction is prevented.

It is apparent that when the extension arms are swung outwardly into extended position, they will bridge the space between a tractor and the railway car. When the arms are swung into the stowed position, they are disposed inwardly of the associated side of the railway car in an over-the-road position.

Since the stowed height of the kingpin receiver unit does not exceed that of the curb guides, the kingpin receiver unit will not interfere with trailer or container loading when it is stowed between the curb guides.

The arrangement of the present invention enables the kingpin receiver to be easily mounted on a conventional full-deck car to enable ready conversion thereof if so desired. Furthermore, it is apparent that the kingpin receiver can be readily lifted off the car and stored if necessary. It should also be noted as seen in FIG. 2 that when the arms are in extended position, the lock pins are adapted to engage the fore and aft portions of the associated arms for preventing the arms from swinging into stowed position until the lock pins are withdrawn from the operative position illustrated at the right-hand side of this figure.

As this invention may be embodied in several forms without departing from the spirit or essential characteristics thereof, the present embodiment is therefore illustrative and not restrictive.

What is claimed is:

1. A kingpin receiver comprising body means defining an elongated slot for receiving a kingpin, latching means supported by said body means to hold a kingpin in place within said slot, extension means disposed at at least one side of said body means and adjacent at least one end of said slot, said extension means being moveable between stowed position and an extended position wherein it extends laterally of said body means to receive and guide a kingpin into said slot, and means connecting said latching means with said extension means whereby movement of said extension means automatically operates said latching means.

2. A kingpin receiver comprising body means defining an elongated slot for receiving a kingpin, said slot extending throughout the width of said body means and being open at opposite sides of the body means, latching means supported by said body means to hold a kingpin in place within said slot, extension means disposed at opposite sides of said body means and fore and aft of each end of said slot, the extension means at each side of the body means including a pair of swingably mounted arms, said arms being swingable between a stowed position and an extended position extending laterally of said body means to receive and guide a kingpin into said slot, and means connecting at least one of the arms at each side of said body means with a portion of said latching means whereby movement of said one arm at each side of said body means automatically operates said latching means.

References Cited

UNITED STATES PATENTS

| | | | |
|---|---|---|---|
| 2,355,867 | 8/1944 | Jarvis | 105—368 |
| 2,950,690 | 8/1960 | Bohlen | 105—368 |
| 3,058,603 | 10/1962 | Tantlinger | 105—368 |
| 3,168,876 | 2/1965 | Clejan | 105—368 |
| 3,180,281 | 4/1965 | Sherrie et al. | 105—366 |
| 3,297,178 | 1/1967 | Bohlen | 214—38 |
| 3,310,185 | 3/1967 | Stricker et al. | 214—38 |

DRAYTON E. HOFFMAN, Primary Examiner

U.S. Cl. X.R.

105—368